May 5, 1959  
J. S. STEUBY  
2,884,839  
CAM GENERATOR  
Filed Feb. 14, 1955
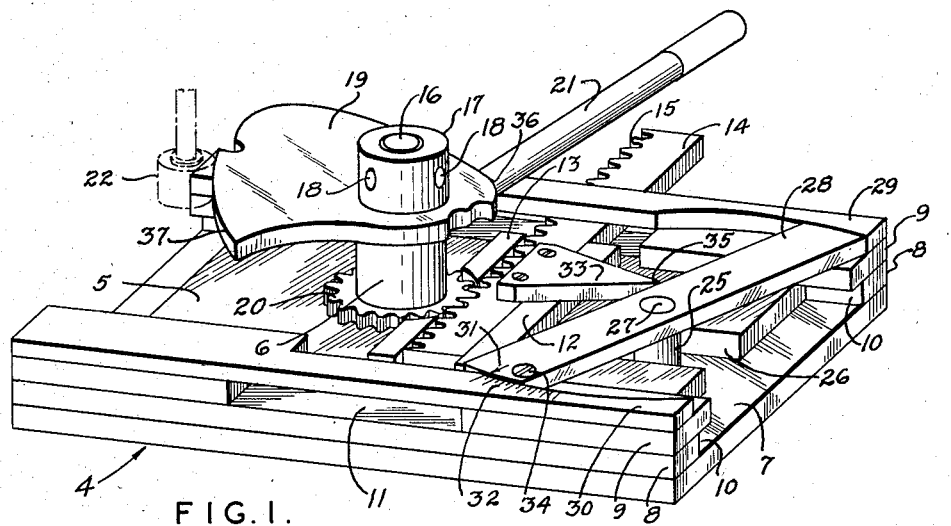
FIG. I.
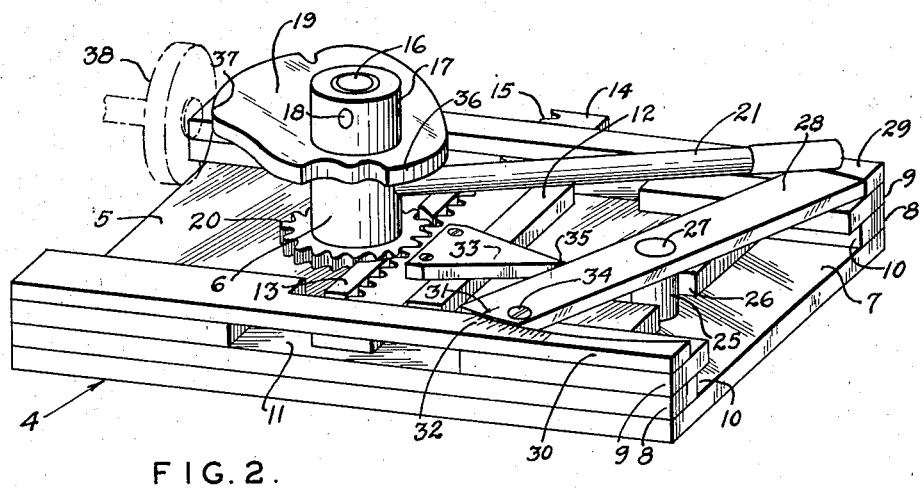
FIG. 2.
INVENTOR.  
JOHN S. STEUBY  
BY  
ATTORNEY United States Patent Office 2,884,839
Patented May 5, 1959

2,884,839
CAM GENERATOR
John Samson Steuby, St. Louis, Mo.
Application February 14, 1955, Serial No. 487,770
2 Claims. (Cl. 90—20)

This invention relates to machines for forming cams to insure accurate rise of the cam operating surface.

Such machines, with which applicant is familiar, have been quite cumbersome and complicated both in structure and operation while not insuring exact accuracy in cam formation, particularly where a constant rise is desired. The present invention provides for a cam generator which is much simpler than previous devices, yet insures accurate cam generation, together with adjustability for varying the rise of the cam working surface.

In the accompanying drawings which illustrate the invention—

Fig. 1 is a perspective view of a cam generator according to the present invention, with cooperating mill.

Fig. 2 is a similar view of the cam generator, but showing the cam shifted angularly and linearly for presenting a different part of the cam to a grinding wheel or mill.

The novel cam generator consists of a base portion 4, a slidable carriage 5, and a work mount 6. Base 4 consists of a flat plate 7, having parallel side edges upon which blocks 8 and 9 are stacked to form longitudinal guideways 10 centrally cut out, as at 11. Extending transversely of carriage 5, which is formed principally of a single plate, are a pair of guides 12 and 13, the latter being centrally cut out for a purpose to be described. Slidably received between guides 12 and 13 is a rack 14 having teeth 15 on what may be termed the forward edge thereof.

Work mount 6 consists of a cylindrical bar journalled in carriage plate 5 and having a reduced upward extension 16 which is threaded to receive a work clamping nut 17 having radial holes, as at 18 for accommodating a tightening bar. Obviously, this nut may be otherwise formed, as with knurling or of hexagonal or other shape for receiving a wrench. The nut is adapted for clamping a cam blank 19, perforated to receive the mounting extension on journalled mount 6. At the base of the mount and rigid therewith is a pinion 20 whose teeth extend through the recessed central portion of guide bar 13 to mesh with rack teeth 15. A handle bar 21 projects radially from mount 6 for manual rotation thereof. There is represented in broken lines at 22 an end mill against which the working face of multiple lobe cam blank 19 is presented for initial generation of a new cam by the novel machine.

A post 25 projects upwardly from base plate 7 through a recess 26 in carriage plate 5 and has a reduced part 27 at its upper extremity pivotally receiving a sine bar 28. The ends of the sine bar are curved in the plane of rotation about the center thereof and rotate within closely fitting guiding portions of longitudinal bars 29 and 30 mounted on top of guide forming bars 9, previously mentioned, for stabilizing the sine bar. At one end of sine bar 28 are index markings 31 and 32. A machine screw 34 in one end of the sine bar provides for fixing the same in its adjusted position. A triangular follower 33 is secured to rack 14 and has a rearwardly extending edge 35 which rides upon the adjacent edge of sine bar 28 during shifting of the rack.

In operation, the cam blank is secured upon mount 6, as explained, and the machine is placed in proper position relative to the mill for forming the working face of the cam. Starting with an extreme portion 36 of the cam face in engagement with the mill, handle 21 is rotated clockwise to progressively move the cam face into engagement with the mill teeth. Simultaneously, with such rotation of the cam, rack 14 is caused to move transversely across carriage 5 and follower piece 33, in moving along sine bar 28, forces shifting of the carriage and, with it, the work mount and cam linearly toward the mill to progressively increase the depth of cutting and the rise of the cam per unit of angular rotation thereof.

Fig. 2 shows a portion 37 of the cam in contact with a grinding wheel 38 and carriage 5 propelled its maximum distance toward the grinder. With the sine bar previously adjusted and locked, in accordance with index markings 31 and 32 to provide the desired unit rise of the cam, this operation will quickly and accurately effect such constant rise. While this invention is well adapted for generating cams having constant or uniform rise, the guiding edge of the sine bar may be curved instead of straight to provide for variable linear shifting of the carriage and rise of the cam per unit of rotation of the work mount. Furthermore, the sine bar may be shifted, after a predetermined angular movement of this blank, to alter the unit rise of the ensuing portion of the cam face being generated.

The invention may be modified as will occur to those skilled in the art and the exclusive use of all modifications as come within the scope of the appended claims is contemplated.

I claim:

1. A cam generating machine comprising a base positioned for association with a cam forming device, parallel guideways in said base, a carriage on said base having guide elements cooperating with said guideways to constrain said carriage for linear movements to and from the forming device, a rack slidably mounted on said carriage and constrained thereby for linear movements transversely of the direction of movement of said carriage, said carriage having a recess, a sine bar having a pivotal mounting secured to said base and extending from said base through said recess in said carriage, adjustable means to rigidly secure said sine bar to said base, a work mount journalled on said carriage adjacent said rack, a gear coaxial and rigid with said mount and meshing with said rack for shifting the same as said mount and the work are rotated, a handle on said mount for manual rotation thereof, and an edged follower on said rack slidable along said sine bar, when fixed in adjusted position, during rotation of said mount and the work for enforcing linear movement of said carriage and the work toward the desired cam forming device for producing the cam rise.

2. A machine, as described in claim 1, in which said base has arcuate stabilizing parts receiving the ends of said sine bar, there being indexing markings on one of said parts and the corresponding sine bar end.

References Cited in the file of this patent

UNITED STATES PATENTS

| 2,366,993 | Antos | Jan. 9, 1945 |
| 2,394,671 | Duncan | Feb. 12, 1946 |
| 2,435,900 | Perez | Feb. 10, 1948 |
| 2,436,588 | Martin | Feb. 24, 1948 |
| 2,507,547 | Shephard | May 16, 1950 |
| 2,572,395 | Savage | Oct. 23, 1951 |
| 2,600,591 | Wang | June 17, 1952 |

FOREIGN PATENTS

| 434,154 | Germany | Mar. 27, 1925 |
| 536,272 | France | Apr. 29, 1922 |